June 2, 1931.  H. R. MINOR  1,808,428
PROCESS OF CURING TIRES AND THE LIKE
Filed June 24, 1927
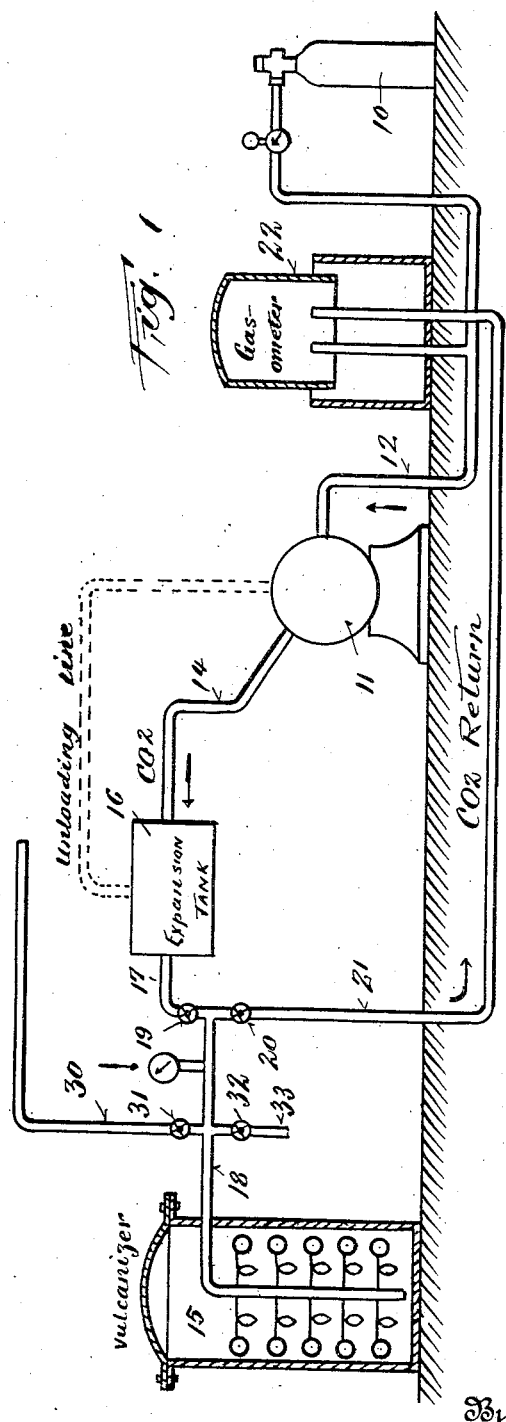
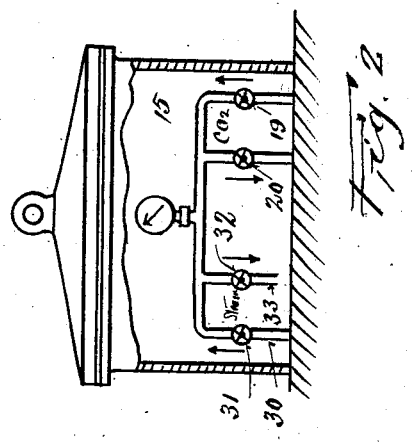
Inventor
Henry R. Minor
By his Attorneys
Daly & Daly Patented June 2, 1931

1,808,428

UNITED STATES PATENT OFFICE

HENRY R. MINOR, OF OSSINING, NEW YORK, ASSIGNOR, BY MESNE ASSIGNMENTS, TO THE LIQUID CARBONIC CORPORATION, A CORPORATION OF DELAWARE

PROCESS OF CURING TIRES AND THE LIKE

Application filed June 24, 1927. Serial No. 201,037.

This invention relates to an improved process of curing rubber tires and the like, and it includes the steps of bringing up the initial pressure in air bags with a gaseous medium and then maintaining said pressure by another gaseous medium while curing is effected that is to say by my process, I bring up the pressure in air bags by an initial pressure gas and maintain said pressure by another gas or gaseous mixture which is less expensive than the initial pressure gas.

In the art of curing rubber tires, it has heretofore been the practice to fill the air bags with about a quart of glycerine and then use air as a pressure means, both initially and during the progress of the cure to maintain pressure. Because a large proportion of air used leaked out into the heaters and settled at the bottom thereof, a certain percentage of tires would come out improperly cured even when agitators were used to overcome the said disadvantages.

In my earlier investigations, I used carbon dioxide ($CO_2$) as a pressure means to bring up and maintain the pressure in air bags with excellent results. Because, however, of the large losses of this expensive gas during the curing stage this process was expensive, I accordingly devised a method of maintaining the pressure in air bags with a cheaper gas, as air, steam or the like, after said pressure was brought up with carbon dioxide. I prefer to use as the pressure maintaining agent a moisture supplying medium and I found high pressure steam either with or without an inert gas to give very good results. A small proportion of air with the steam apparently produces no ill effects. Steam is cheaper than compressed air, and I, therefore, prefer to use steam as the primary pressure maintaining medium after the pressure has been brought up by the selected initial pressure producing gas.

As an example of a preferred form of carrying out my improved process I use carbon dioxide either alone or in combination with other inert gases, as nitrogen or flue gases for the initial pressure gas to bring up the pressure in air bags for the purpose of curing rubber tires or other rubber goods. As soon as the desired pressure has been reached, carbon dioxide or other inert gas, if used, is shut off and pressure is maintained by high pressure steam either without or with a small proportion of an inert gas. Pressure is thus maintained until cure is effected. When steam is used as the pressure maintaining medium it is shut off at the end of the cure and a small portion of the steam may be returned with the carbon dioxide to the gasometer, where, by condensation, it will be separated from the carbon dioxide which is then ready for reuse. Obviously mixtures of steam with other inert gases as flue gases or other inexpensive gases may be used as the pressure maintaining medium.

In order to carry out my new and improved process any suitable apparatus will serve and for the purpose of illustration, I have shown a diagrammatic representation of an apparatus suited for practicing my process.

In the accompanying drawings,

Figure 1 is a view in elevation of apparatus suited for carrying out my invention, and Figure 2 is a view showing connections of the gas supply and gas returning means at the vulcanizer.

In said drawings, I have indicated at 10 a $CO_2$ supply which is connected to the gasometer 22 and the compressor 11 by a conduits 12 for supply $CO_2$ or other initial pressure gas. A pressure line 14 connects the compressor 11 to the vulcanizer 15, through an expansion tank 16 and conduits 17 and 18. The cut off valves 19 and 20 permit control of $CO_2$ or other pressure medium to or from the vulcanizer as valves 19 and 20 respectively are opened and closed. A return conduit 21 returns the used $CO_2$ and some of the steam to the gasometer 22 where the steam condenses as stated above. When high pressure steam is used it is admitted through conduit 30, valve 31, to the vulcanizer and pressure is thereby maintained. By opening valve 32 in conduit 33 the pressure maintaining medium may be released to the desired extent. Valve 32 is then closed and valve 20 is opened for returning the initial pressure gas to the gasometer.

From the above apparatus, it will be clear that $CO_2$ or the like may be supplied to the vulcanizer under sufficient pressure to bring up said pressure in the air bags within the vulcanizer. Valve 19 is then closed and the inlet valve 31 for admission of steam or other pressure maintaining medium is then opened to admit the same at high pressure for backing up the $CO_2$ under pressure. After curing has been effected the valve 31 is closed and the $CO_2$ valve 20 open for the return of the $CO_2$ with some of the steam to the gasometer in the manner and for the purposes stated. While steam is preferred for the best results and because of its low cost any other fluid may be used for backing the initial pressure of the beneficial gas.

Having now described my invention, what I claim as new and useful, and desire to secure by Letters Patent is:—

1. The method of curing rubber articles which comprises placing an expansible bag adjacent said articles, then causing pressure to be produced in said bag by carbon dioxide gas and backing said medium by a heated condensible gas to maintain said pressure during the curing action.

2. The method of curing rubber articles which comprises placing an expansible bag adjacent said articles, then filling said bag with carbon dioxide to produce initial pressure and backing up said initial pressure by steam.

3. That method of curing rubber tires with aid of air bags under pressure which consists in bringing up the initial pressure of air bags with carbon dioxide and backing said pressure with steam.

4. That method of curing rubber tires with aid of air bags under pressure which consists in bringing up the initial pressure of air bags, with carbon dioxide and backing said pressure with steam, then causing said carbon dioxide and a portion of the steam to be returned to a gasometer.

5. That method of curing rubber tires with aid of air bags under pressure which consists in bringing up the initial pressure of air bags with carbon dioxide and backing up said pressure with steam and an inert gaseous medium.

6. That method of maintaining an expansible vulcanizing pressure bag in condition for curing rubber articles, which comprises using an inert gas to bring up the pressure in said bag and maintaining said pressure by steam.

In testimony whereof I have hereunto set my hand on this 20th day of June, A. D. 1927.

HENRY R. MINOR.